United States Patent
Markovich

(10) Patent No.: US 11,697,553 B1
(45) Date of Patent: Jul. 11, 2023

(54) MULTI-STORY STRUCTURE PACKAGE DELIVERY SYSTEM

(71) Applicant: Stanislav Markovich, Cambridge (CA)

(72) Inventor: Stanislav Markovich, Cambridge (CA)

(*) Notice: Subject to any disclaimer, the term of this patent is extended or adjusted under 35 U.S.C. 154(b) by 283 days.

(21) Appl. No.: 17/149,140

(22) Filed: Jan. 14, 2021

Related U.S. Application Data

(60) Provisional application No. 62/961,259, filed on Jan. 15, 2020.

(51) Int. Cl.
*B66B 9/02* (2006.01)
*B66B 5/02* (2006.01)
*B66B 11/02* (2006.01)
*B66B 1/46* (2006.01)

(52) U.S. Cl.
CPC ............ *B66B 9/02* (2013.01); *B66B 1/468* (2013.01); *B66B 5/024* (2013.01); *B66B 11/0226* (2013.01)

(58) Field of Classification Search
CPC .......... B66B 9/02; B66B 1/468; B66B 5/024; B66B 11/026; B66B 11/0226; B65G 1/127; B65G 1/137
See application file for complete search history.

(56) References Cited

U.S. PATENT DOCUMENTS

| | | | |
|---|---|---|---|
| 5,316,152 A | 5/1994 | Ross | |
| 5,564,879 A | 10/1996 | Noguchi | |
| 6,059,521 A * | 5/2000 | Rapeli | B63B 25/22 414/803 |
| 7,036,630 B2 | 5/2006 | Korchagin et al. | |
| 7,096,996 B2 | 8/2006 | Korchagin et al. | |
| 7,204,344 B2 | 4/2007 | Korchagin et al. | |
| 8,132,650 B2 | 3/2012 | ShterenBerg | |
| 10,173,837 B2 | 1/2019 | Lindblom | |
| 10,280,047 B2 | 5/2019 | Falk et al. | |
| 2009/0271207 A1* | 10/2009 | Lanigan | G07C 9/27 340/5.2 |
| 2018/0132419 A1* | 5/2018 | Ueda | A01F 12/46 |
| 2019/0152634 A1* | 5/2019 | Almogy | B65G 17/002 |
| 2021/0125441 A1* | 4/2021 | Ufkes | G07C 9/00309 |

FOREIGN PATENT DOCUMENTS

| | | | | |
|---|---|---|---|---|
| CN | 106163949 A | * | 11/2016 | ........... G06Q 10/083 |
| JP | 2018122997 A | * | 8/2018 | |

OTHER PUBLICATIONS

Machine translation of JP 2018122997 (Year: 2018).*

* cited by examiner

*Primary Examiner* — Michael R Mansen
*Assistant Examiner* — Michelle M Lantrip
(74) *Attorney, Agent, or Firm* — Cramer Patent & Design, PLLC; Aaron R. Cramer

(57) ABSTRACT

A high rise structure multi-level delivery system comprises a vertical conveyor belt system having a plurality of trays configured to carry a specific delivery parcel to a specific floor of a high rise structure. The conveyor is mounted such that a bottom of the conveyor resides in a ground floor room of the high rise structure and a top resides in a roof room on a roof of the high rise structure. The conveyor is capable of being accessed via an interior room located at each level of the high rise structure.

13 Claims, 5 Drawing Sheets

MULTI-STORY STRUCTURE PACKAGE DELIVERY SYSTEM

RELATED APPLICATIONS

The present invention is a continuation of, was first described in, and claims the benefit of U.S. Provisional Application No. 62/961,259 filed Jan. 15, 2020, the entire disclosures of which are incorporated herein by reference.

FIELD OF THE INVENTION

The present invention relates to a package delivery system for a multi-story structure.

BACKGROUND OF THE INVENTION

When receiving packages, it is common to have the delivery personnel personally deliver the package directly to the address indicated as the shipping location. Often times, these shipping locations are at multi-story buildings, either residential or commercial, and they can be in urban areas, as well as suburban or rural areas.

It is an inconvenience to have the delivery personnel to deliver the package directly to the address if it is on an upper floor, especially in the cases where the resident is not present, and the package delivery requires a signature. This may mean that the delivery personnel must schedule another time to deliver the package and ascend multiple floors again.

Additionally, sometimes the security personnel at the specific multi-story structure may require the delivery personnel to sign and out, call the resident of the shipping location, or even to only leave the package at the security desk. Many buildings do not even have a security desk and the delivery personnel must leave the package oat the lobby, which is non-secure and can lead to damage or theft of the package. Therefore, there is a need to have a means to deliver the package to a desired floor of a multi-story structure in a safe and convenient manner.

SUMMARY OF THE INVENTION

The principles of the present invention provide for a multi-story package delivery system has a multi-story structure having a plurality of interior floors and a roof, a conveyor which is mounted in a vertical manner within the multi-story structure with each of the interior floors has a dedicated interior floor conveyor room that has access to the conveyor, an interior floor conveyor room door which provides authorized access to each of the interior floor conveyor rooms, an access indication panel which is located above the interior floor conveyor room door which is equipped with an entry allowed indicator and a no entry allowed indicator to indicate to a user that the interior floor conveyor room door is opened to retrieve a package, a roof conveyor room which is disposed on the roof of the multi-story structure, a roof conveyor room door which provides access to each of the roof conveyor rooms, a ground floor conveyor room which is disposed on a ground level to load a package, a conveyor drive means which is contained within the ground floor conveyor room, a conveyor control means which is adjacent to the conveyor drive means and in electrical communication with the same, and, a ground floor conveyor room door which provides authorized access to each of the ground floor conveyor rooms.

The conveyor drive means is in operable communication with and drives the conveyor. The conveyor control means controls the conveyor which drives the belt and the carriage and includes a plurality of buttons or a touch screen device enabling a delivery personnel to program the travel of the conveyor, the belt, the carriage, and the package. The ground floor conveyor room, each interior floor conveyor room, and the roof conveyor room are all in environmental communication with each other and as the conveyor passes through each of the rooms, the ground floor conveyor room includes a belt mounted on to and driven by the conveyor.

Each interior floor conveyor room on each interior floor may be a dedicated area of the interior floor and is able to be accessed by tenants or residents of that particular interior floor. The no entry allowed indicator may indicate that it is not safe to enter the interior floor conveyor room as falling through a floor opening in the interior floor is an imminent safety risk. The floor opening may allow for penetration of the belt and the carriage while the package is restrained upon the carriage by the supports and the net.

An electric door strike may be installed on the interior floor conveyor room door to prohibit the opening of the interior floor conveyor room door, whenever the no entry allowed indicator is activated. Once the package has been retrieved, and the interior floor conveyor room door may be closed, the user could press a carriage release pushbutton, thus allowing the carriage to return to the ground floor conveyor room. The multi-story package delivery system may also comprise a conveyor limit switch which may be provided near the carriage in the interior floor conveyor room to signal the appropriate positioning of the carriage and allow it to stop at the correct interior floor conveyor.

The conveyor limit switch may be present on belt to indicate presence of the carriage and the opening of the interior floor conveyor room door is limited by the electric door strike. The roof conveyor room may be a dedicated room on top of or extending away from the roof of the multi-story structure. The ground floor conveyor room may be disposed on an area where a delivery personnel accesses the bottom of the conveyor. The conveyor control means may be configured to be in electrical communication with a power supply from the multi-story structure. The conveyor control means may be configured to be in electrical communication with its own power supply.

The conveyor control means may include a forward switch and a reverse switch, as well as one or more limit switches located at the top of the conveyor and at the bottom of the conveyor. The conveyor control means may incorporate an intercom system within a lobby or each individual interior floor conveyor room, and an emergency shutoff or an emergency activation. The ground floor conveyor room and the ground floor conveyor room door may be located on an interior of the multi-story structure. The ground floor conveyor room and the ground floor conveyor room door may be located on an exterior of the multi-story structure.

The carriage may be mounted on to the belt that is oriented so that a planar floor thereof is parallel with the ground level of each interior floor conveyor room, the roof conveyor room, and the ground floor conveyor room. The carriage includes a plurality of vertical supports supporting the net supported on a portion of the belt adjacent to the carriage to provide a way to minimize or eliminate any unwanted movement of the package as it vertically travels. The conveyor, the belt, and the carriage may operate in such a manner so that the carriage is adapted to be easily accessible by a user in each of the ground floor conveyor rooms, each interior conveyor rooms, and the roof conveyor rooms. The multi-story structure may be a high-rise or other structure having a plurality of interior floors, each with a plurality of different shipping location addresses.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
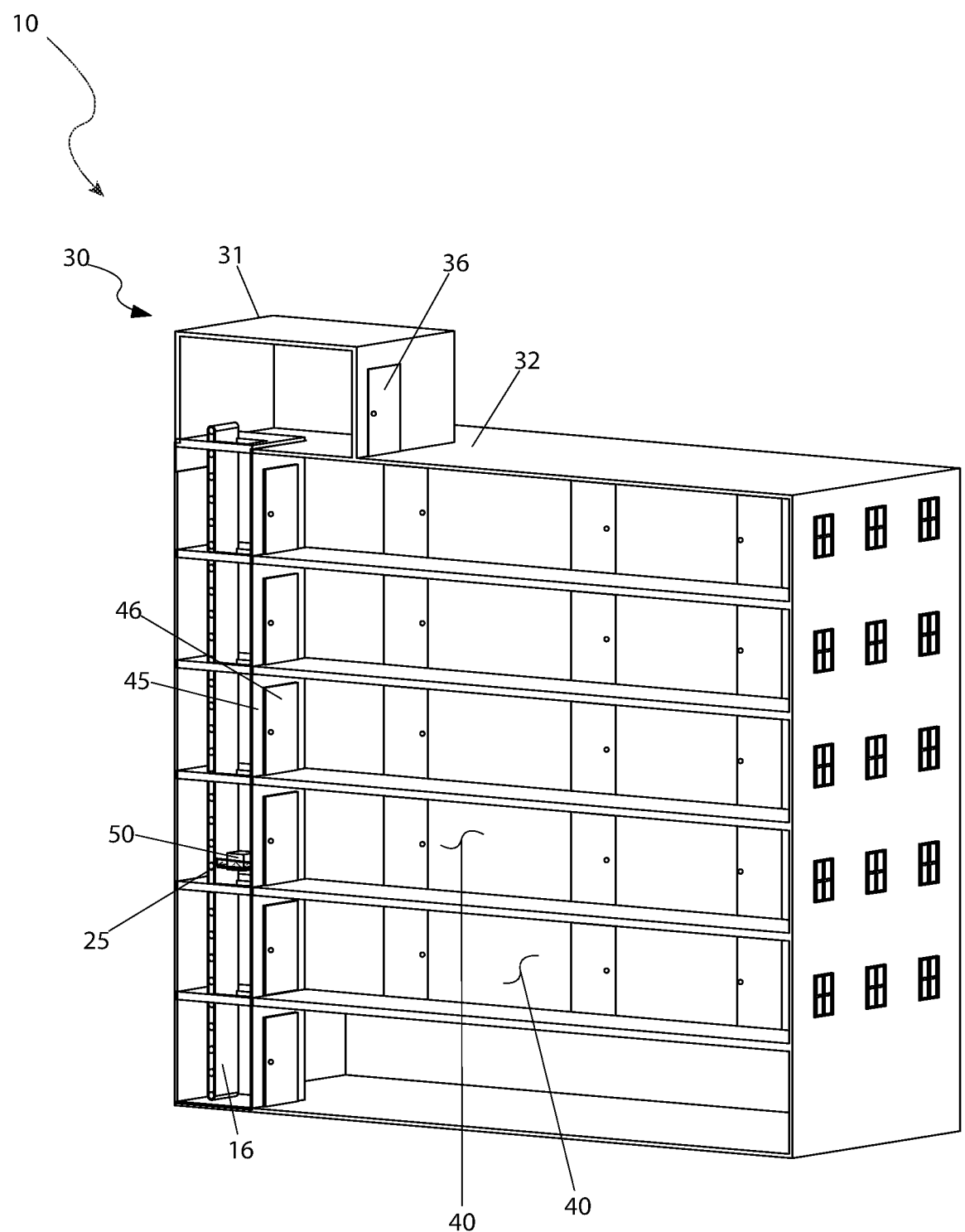
FIG. 1 is a perspective, partially cut-away view of a multi-story structure with a multi-story package delivery system installed therein.

DESCRIPTIVE KEY 10 multi-story package delivery system
14 conveyor drive means
15 conveyor
16 belt
19 conveyor control means
20 ground floor conveyor room door
21 ground floor conveyor room
25 carriage
26 net
27 support
30 multi-story structure
31 multi-story roof conveyor room
32 roof
33 side
36 roof conveyor room door
40 interior floor
45 interior floor conveyor room
46 interior floor conveyor room door
50 package
55 delivery personnel
60 access indication panel
65 entry allowed indicator
70 no entry allowed indicator
75 floor opening
80 electric door strike
85 carriage release pushbutton
90 conveyor limit switch
95 emergency shutoff switch
100 intercom speaker
105 AC power
110 power control panel
115 driver controller
120 primary intercom panel
125 secondary intercom panel
130 main logic controller
135 input/output array
140 cable harness

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

DETAILED DESCRIPTION OF THE FIGURES

Figure 2:
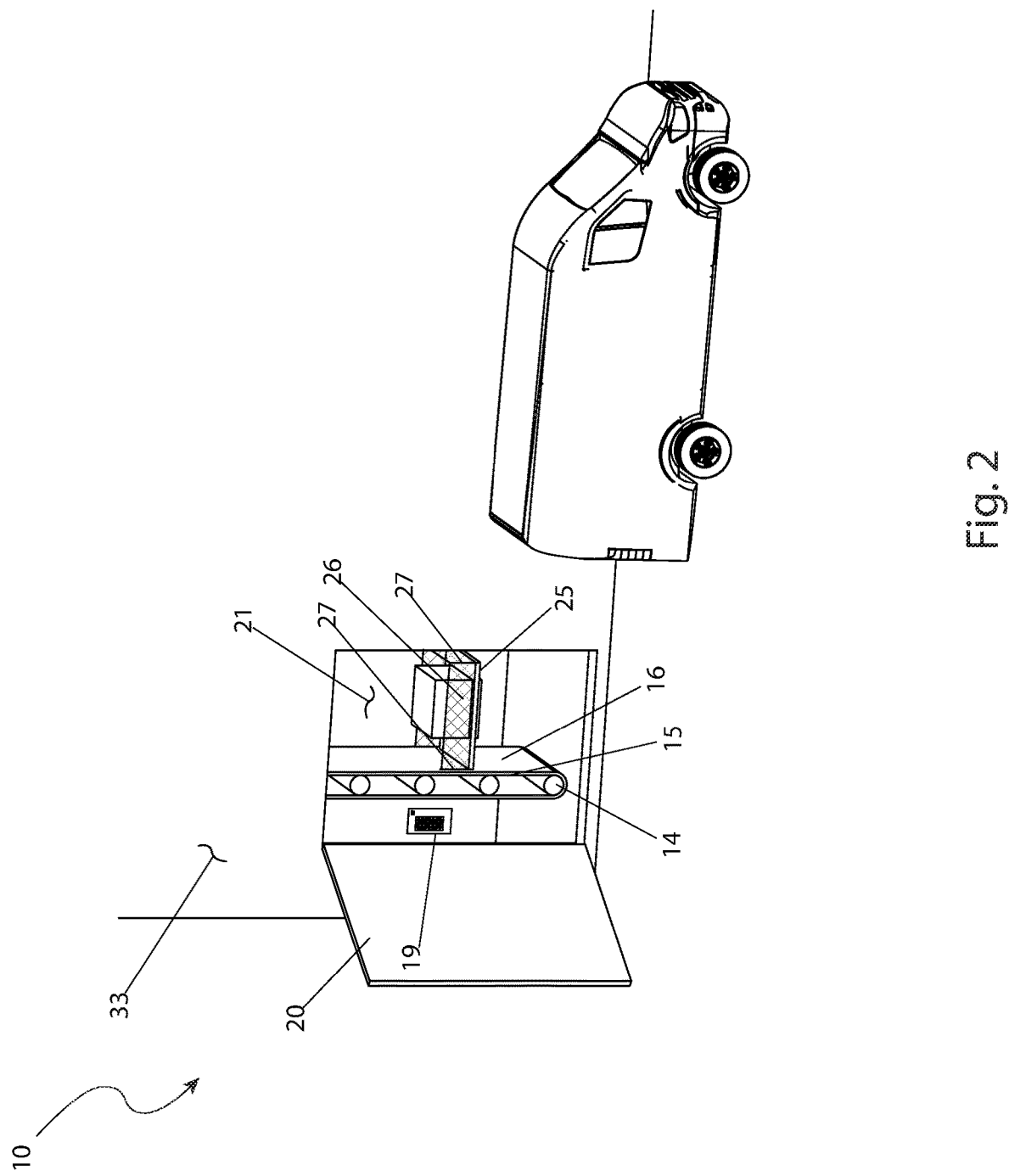
FIG. 2 is a close-up view of a side of the multi-story structure, showing the initial placement of the package on the carriage of the system.

Referring now to FIG. 1, there is illustrated a multi-story package delivery system 10 that is installed within a multi-story structure 30. The multi-story structure 30 is depicted as partially cut-away to more clearly illustrate the system 10. FIG. 2 illustrates a close-up view of the side 33 of the multi-story structure 30 showing the ground floor conveyor room 21 and more details of the system 10. The multi-story structure 30 is anticipated to be a high-rise or other structure having multiple interior floors 40, each with multiple different shipping location addresses located thereon. Such multi-story structures 30 can be high-rise residential or commercial buildings.

The system 10 includes a conveyor 15 mounted in a vertical manner within the multi-story structure 30. Each interior floor 40 has a dedicated interior floor conveyor room 45 that has access to the conveyor 15. An interior floor conveyor room door 46 provides authorized access to the interior floor conveyor room 45. Located on the roof 32 of the multi-story structure 30 is a roof conveyor room 31, also with a roof conveyor room door 36 that provides access thereto. At the ground level, or an area where a delivery personnel 55 can access the bottom of the conveyor 15 to load a package 20 thereon, is a ground floor conveyor room 21. Similar to the interior floor conveyor room 45 and roof conveyor room 31, there is a ground floor conveyor room door 20 that provides authorized access thereto. The ground floor conveyor room 21 and ground floor conveyor room door 21 may be located on the interior or exterior of the multi-story structure 30. The roof conveyor room 31 may be a dedicated room on top of or extending away from the roof 32 of the multi-story structure 30. Each interior floor conveyor room 45 on each interior floor 40 may be a dedicated area of the interior floor 40 and able to be accessed by tenants or residents of that particular interior floor 40. The ground floor conveyor room 21, each interior floor conveyor room 45, and the roof conveyor room 31 may all be in environmental communication with each other, as the conveyor 15 passes through each of these rooms 21, 31, 45 and may be disposed in a similar fashion as an elevator shaft.

Located within the ground floor conveyor room 21 is the conveyor drive means 14, which is in operable communication with and drives the conveyor 15. Mounted on to and driven by the conveyor 15 is a belt 16. A carriage 25 is mounted on to the belt 16 and is oriented so that the planar floor thereof is parallel with the ground level of each interior floor conveyor room 45, the roof conveyor room 31, and the ground floor conveyor room. The carriage 25 may preferably have at least two (2) vertical supports 27 supporting a net 26. The net 26 can also be supported on a portion of the belt 16 adjacent to the carriage 40 if so desired. The carriage 25 is capable of supporting a weight of a typical package 50 and can be of any dimensions or weight that is desirable. The supports 27 and net 26 provide a way to minimize or eliminate any unwanted movement of the package 50 as it vertically travels. The conveyor 15, belt 16, and carriage 25 operate in such a manner so that the carriage 25 is easily accessible by a user in each of the ground floor conveyor room 21, each interior conveyor room 40, and the roof conveyor room 31. Mounted on or adjacent to the conveyor drive means 14 is a conveyor control means 19 in electrical communication therewith.

The conveyor control means 14 is configured to be in electrical communication with the same power supply as the multi-story structure 30 or on its own power supply. The conveyor control means 19 controls the conveyor 15 which drives the belt 16 and the carriage 25. The conveyor control means 14 preferably includes a plurality of buttons or a touch screen device enabling a delivery personnel 55 to program the travel of the conveyor 15, belt 16, carriage 25, and package 50. The conveyor control means 19 may have a forward (i.e., upward) and reverse (i.e., backward) switch, as well as limit switches located at the top of the conveyor 15 (i.e., within the roof conveyor room 31) and at the bottom of the conveyor 15 (i.e., within the ground floor conveyor room 21). Additionally, the conveyor control means 19 may incorporate an intercom system with the lobby or each individual interior floor conveyor room 45, and emergency shutoff or emergency activation.

Figure 3:
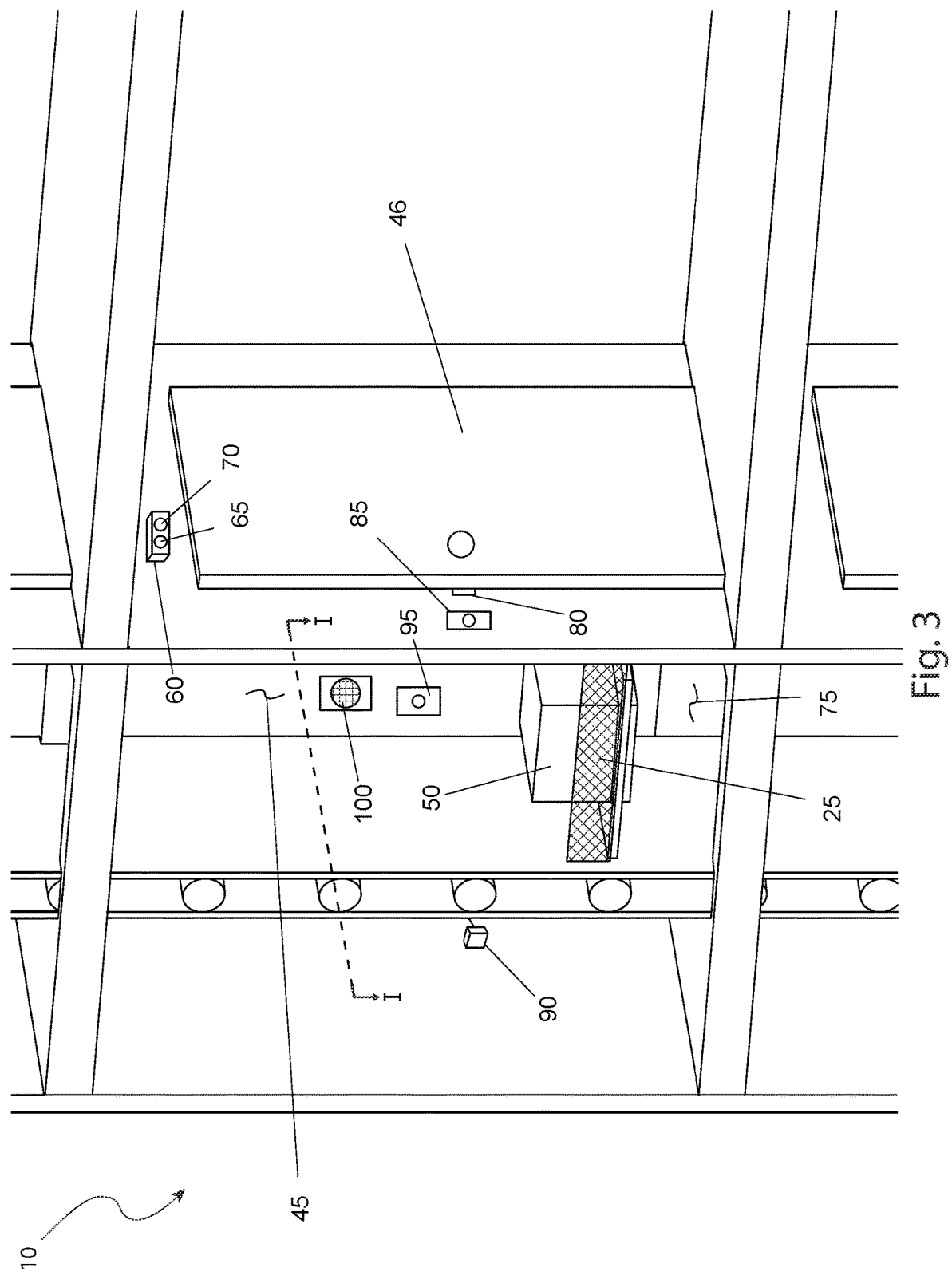
FIG. 3 is a close-up view of an interior floor conveyor room, as part of the multi-story package delivery system, according to the preferred embodiment of the present invention.

Referring next to FIG. 3, a close-up view of an interior floor conveyor room 45, as part of the multi-story package delivery system 10, according to the preferred embodiment of the present invention is disclosed. An access indication panel 60 is located above the interior floor conveyor room door 46 and is equipped with an entry allowed indicator 65 such as a green light, and a no entry allowed indicator 70 such as a red light. The access indication panel 60 provides indication to the user that the interior floor conveyor room door 46 may be opened to retrieve a package 50. Alternately, the no entry allowed indicator 70 will indicate that it is not safe to enter the interior floor conveyor room 45 as falling through a floor opening 75 in the interior floor 45 is an imminent safety risk. Safety may be further enhanced with an electric door strike 80 installed on the interior floor conveyor room door 46. The electric door strike 80 would prohibit the opening of the interior floor conveyor room door 46, whenever the no entry allowed indicator 70 is activated. Once the package 50 has been retrieved, and the interior floor conveyor room door 46 closed, the user would press a carriage release pushbutton 80, thus allowing the carriage 25 to return to the ground floor conveyor room 21 (as shown in FIG. 1). A conveyor limit switch 90 is provided in the proximity of the carriage 25 in the interior floor conveyor room 45 to signal the appropriate positioning of the carriage 25 and allow it to stop at the correct interior floor conveyor 45. Such representation of the interior floor conveyor room 45 is typical for each floor of the multi-story structure 30 (as shown in FIG. 1).

Figure 4:
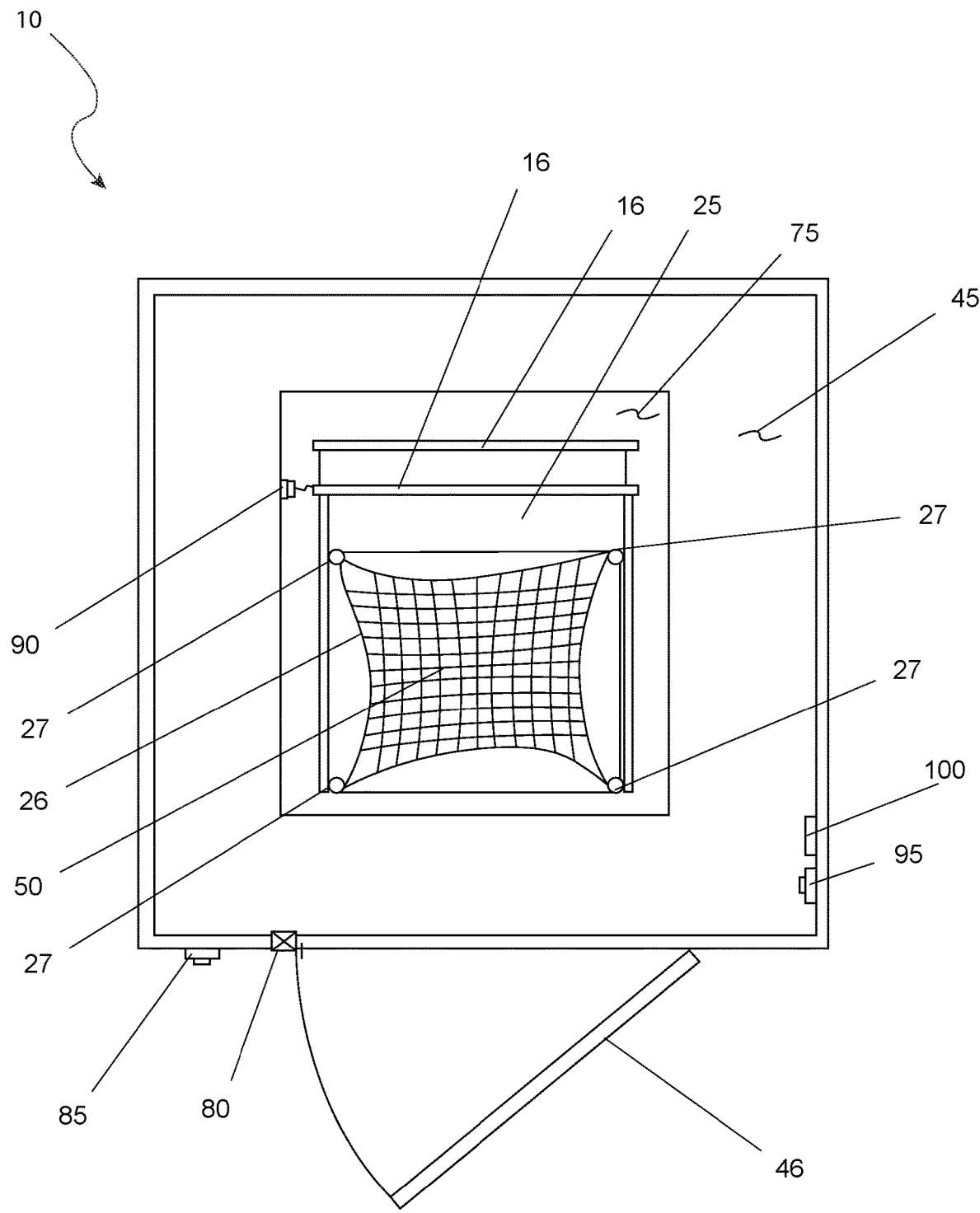
FIG. 4 is a sectional view of the multi-story package delivery system, as seen along a Line I-I, as shown in FIG. 3, according to the preferred embodiment of the present invention.

Referring now to FIG. 4, a sectional view of the multi-story package delivery system 10, as seen along a Line I-I, as shown in FIG. 3, according to the preferred embodiment of the present invention is depicted. The floor opening 75 allows for the penetration of the belt 16 and associated carriage 25. The package 50 is restrained upon the carriage 25 by the supports 27 and the net 26. The conveyor limit switch 90 is present on belt 16 to indicate the presence of the carriage 25. The opening of the interior floor conveyor room door 46 is limited by the electric door strike 80. The carriage release pushbutton 85 in on the exterior of the interior floor conveyor room 45 and ensures that the user is outside of the interior floor conveyor room 45 to prevent being hit by the carriage 25. The emergency shutoff switch 95 and the intercom speaker 100 are in close proximity to the carriage 25 to allow for user access while inside of the interior floor conveyor room 45. Such representation of the interior floor conveyor room 45 is typical for each floor of the multi-story structure 30 (as shown in FIG. 1).

Figure 5:
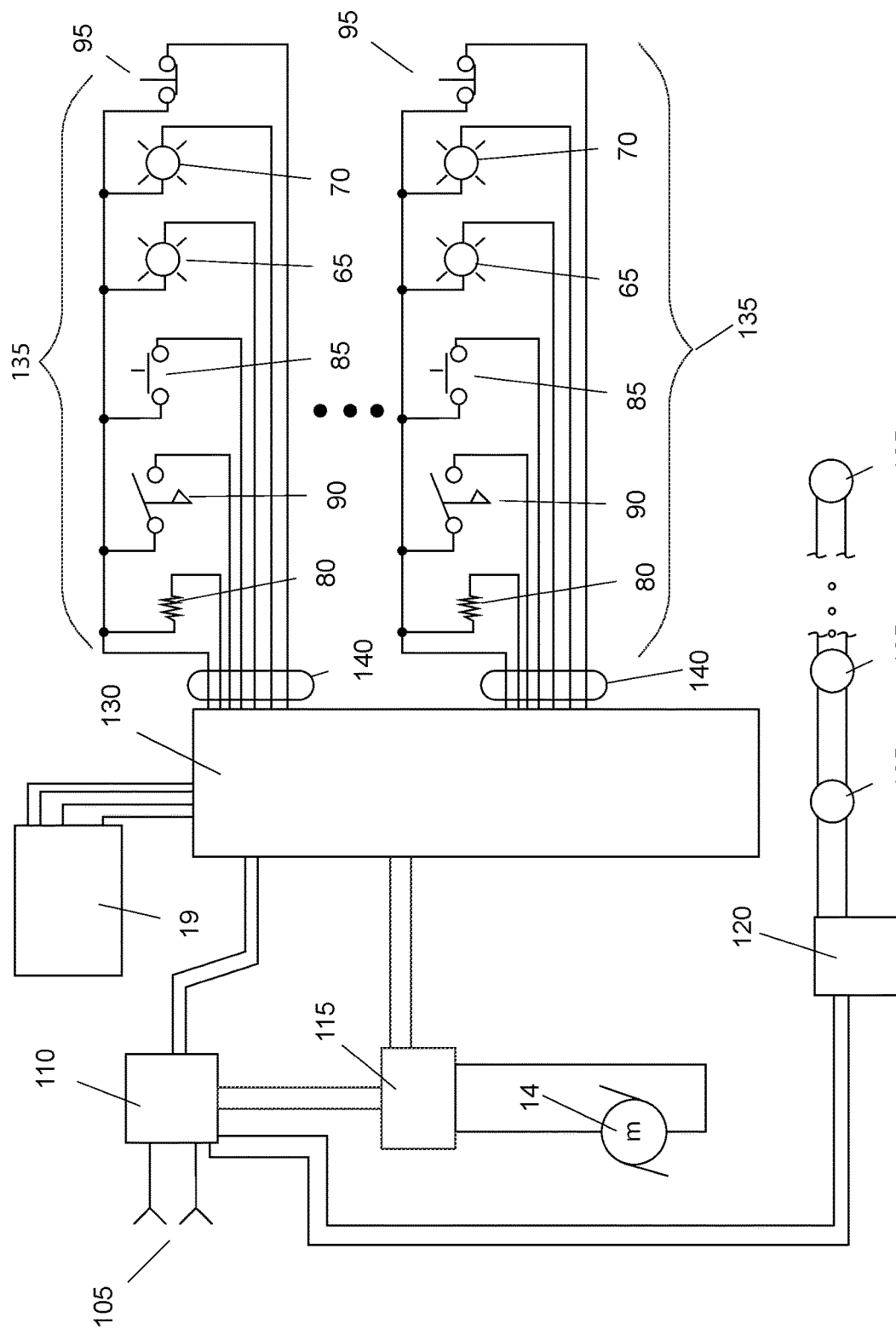
FIG. 5 is an electrical block diagram of the multi-story package delivery system, according to the preferred embodiment of the present invention.

Referring finally to FIG. 5, an electrical block diagram of the multi-story package delivery system 10, according to the preferred embodiment of the present invention is shown. AC power 105 from the multi-story structure 30 (as shown in FIG. 1) is provided to a power control panel 110. Resultant power is then routed to a drive controller 115 which operates the conveyor drive means 14 such as an electric motor. Electric power from the power control panel 110 is also routed to a primary intercom panel 120, envisioned to be located at the ground floor conveyor room 21 (as shown in FIGS. 1 and 2). The primary intercom panel 120 is in electrical communication with a plurality of secondary intercom panels 125, envisioned to be one per each interior floor conveyor room 45 (as shown in FIG. 3). Finally, power from the power control panel 120 is routed to a main logic controller 130 such as a programmable logic controller (PLC). The conveyor control means 19 serves as an input to the main logic controller 130. Each floor of the multi-story structure 30 is provided with an input/output array 135 connected to the main logic controller 130 via a cable harness 140. Within the input/output array 135, the inputs include the conveyor limit switch 90, the carriage release pushbutton 85, and the emergency shutoff switch 95. The outputs within the input/output array 135 include the electric door strike 80, the entry allowed indicator 65, and the no entry allowed indicator 70.

Other embodiments of the system 10 may include an intercom system incorporated within the conveyor control means 19 to communicate between the delivery personnel 55 and the individual that ordered the package 50. Also, there may be a return control means in each interior floor conveyor room 45 to return the carriage 25 to the ground floor conveyor room 21 for subsequent usage.

In an anticipated method of use, an individual who resides on a particular interior floor 40 of a multi-story structure 30 purchases an item that will be delivered as a package 50 to the user. A delivery personnel 55 arrives at the multi-story structure 30 and accesses the ground floor conveyor room 21 by authorized opening of the ground floor conveyor room door 20. The package 50 is placed on the carriage 25 and if necessary, secured thereon by the supports 27 and net 26. The delivery personnel 55 then enters the desired location of the carriage 25 and package 50 to the specific interior floor 40 that the ordering individual desires the package 50 to be delivered via the conveyor control means 19. The conveyor control means 19 then activates the conveyor 15 which drives the belt 16 and the carriage 25 supporting the package 50. When the carriage 25 with the package 50 arrives at the proper interior floor conveyor room 45, the individual ordering the package 50 access the interior floor conveyor room 45 with authorized access via the interior floor conveyor room door 46 to retrieve the package 50.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A multi-story package delivery system, comprising:
a multi-story structure having a plurality of interior floors and a roof;
a conveyor mounted in a vertical manner within the multi-story structure, each of the interior floors has a dedicated interior floor conveyor room that has access to the conveyor;
an interior floor conveyor room door providing authorized access to each of the interior floor conveyor rooms;
an access indication panel located above the interior floor conveyor room door which is equipped with an entry allowed indicator and a no entry allowed indicator adapted to indicate to a user that the interior floor conveyor room door is opened to retrieve a package;
a roof conveyor room disposed on the roof of the multi-story structure;
a roof conveyor room door providing access to the roof conveyor room;
a ground floor conveyor room disposed on a ground level to load a package;
a conveyor drive means contained within the ground floor conveyor room, the conveyor drive means is in operable communication with and drives the conveyor;
a conveyor control means adjacent to the conveyor drive means and in electrical communication therewith, the conveyor control means controls the conveyor which drives a belt and a carriage and includes a plurality of buttons or a touch screen device enabling a delivery personnel to program the travel of the conveyor, the belt, the carriage, and the package; and
a ground floor conveyor room door providing authorized access to the ground floor conveyor room;
wherein the ground floor conveyor room, each interior floor conveyor room, and the roof conveyor room are all in environmental communication with each other and as the conveyor passes through each of the rooms, the ground floor conveyor room includes the belt mounted on to and driven by the conveyor;
wherein the no entry allowed indicator indicates that it is not safe to enter the interior floor conveyor room as falling through a floor opening in the interior floor is an imminent safety risk;
wherein the floor opening allows for penetration of the belt and the carriage and the package is restrained upon the carriage by a support and a net;
wherein an electric door strike is installed on the interior floor conveyor room door to prohibit opening the interior floor conveyor room door, whenever the no entry allowed indicator is activated;
wherein the roof conveyor room is a dedicated room on top of or extending away from the roof of the multi-story structure;
wherein the conveyor control means is configured to be in electrical communication with a power supply from the multi-story structure;
wherein the conveyor control means is configured to be in electrical communication with its own power supply; and
wherein the conveyor control means includes a forward switch and a reverse switch, as well as one or more limit switches located at the top of the conveyor and at the bottom of the conveyor.

2. The multi-story package delivery system, according to claim 1, wherein each interior floor conveyor room on each interior floor is a dedicated area of the interior floor and is accessed by tenants or residents of that particular interior floor.

3. The multi-story package delivery system, according to claim 1, wherein once the package has been retrieved, and the interior floor conveyor room door is closed, the user would press a carriage release pushbutton, thus allowing the carriage to return to the ground floor conveyor room.

4. The multi-story package delivery system, according to claim 3, further comprising a conveyor limit switch provided near the carriage in the interior floor conveyor room to signal the appropriate positioning of the carriage and allow it to stop at the correct interior floor conveyor.

5. The multi-story package delivery system, according to claim 3, wherein the conveyor limit switch is present on the belt to indicate presence of the carriage and the opening of the interior floor conveyor room door is limited by the electric door strike.

6. The multi-story package delivery system, according to claim 1, wherein the ground floor conveyor room is disposed on an area where a delivery personnel accesses the bottom of the conveyor.

7. The multi-story package delivery system, according to claim 1, wherein the conveyor control means incorporates an intercom system within a lobby or each individual interior floor conveyor room, and an emergency shutoff or an emergency activation.

8. The multi-story package delivery system, according to claim 1, wherein the ground floor conveyor room and the ground floor conveyor room door are located on an interior of the multistore structure.

9. The multi-story package delivery system, according to claim 1, wherein the ground floor conveyor room and the ground floor conveyor room door are located on an exterior of the multi-story structure.

10. The multi-story package delivery system, according to claim 1, further comprising the carriage is mounted on to the belt that is oriented so that a planar floor thereof is parallel with the ground level of each interior floor conveyor room, the roof conveyor room, and the ground floor conveyor room.

11. The multi-story package delivery system, according to claim 1, wherein the carnage includes a plurality of vertical supports supporting the net supported on a portion of the belt adjacent to the carriage to provide a way to minimize or eliminate any unwanted movement of the package as it vertically travels.

12. The multi-story package delivery system, according to claim 1, wherein the conveyor, the belt, and the carriage operate in such a manner so that the carriage is adapted to be easily accessible by the user in each of the ground floor conveyor rooms, each interior conveyor rooms, and the roof conveyor rooms.

13. The multi-story package delivery system, according to claim 1, wherein the multi-story structure is a high-rise or other structure having a plurality of interior floors, each with a plurality of different shipping location addresses located thereon.

\* \* \* \* \*